Oct. 22, 1968   J. S. REILLY ET AL   3,406,905
APPARATUS FOR ATOMIZING AND SPRAYING THERMOPLASTIC MATERIALS
Filed Sept. 21, 1966   2 Sheets-Sheet 1
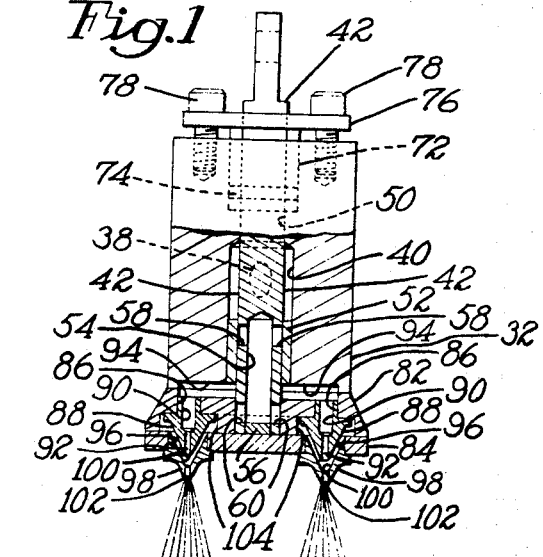
Inventors
John S. Reilly
Harold W. Boothroyd
By their Attorney
Everett A. Littlefield

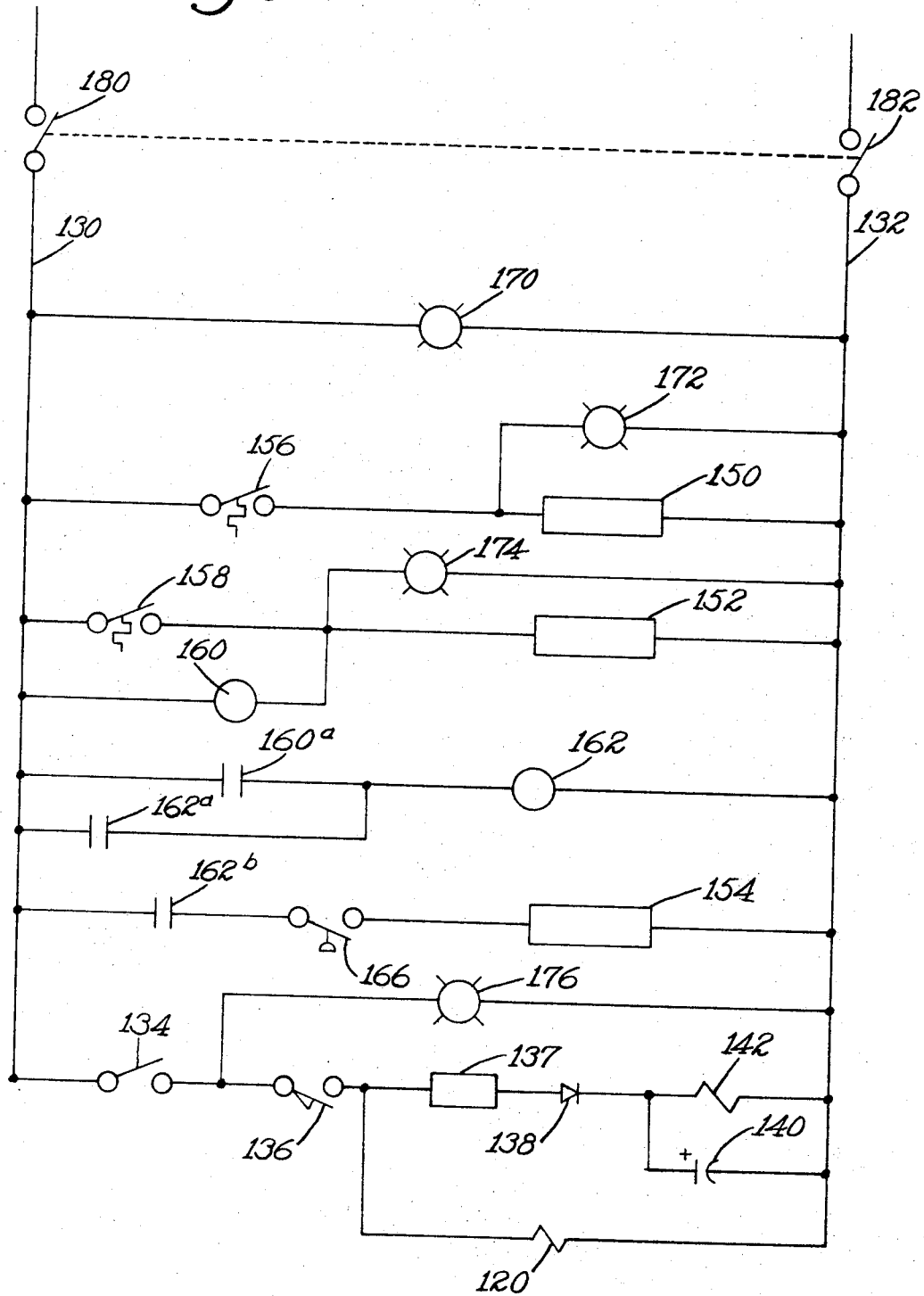

United States Patent Office 3,406,905
Patented Oct. 22, 1968

3,406,905
APPARATUS FOR ATOMIZING AND SPRAYING
THERMOPLASTIC MATERIALS
John S. Reilly, Beverly, and Harold W. Boothroyd, Wenham, Mass., assignors to United Shoe Machinery Corporation, Flemington, N.J., and Boston, Mass., a corporation of New Jersey
Filed Sept. 21, 1966, Ser. No. 581,080
1 Claim. (Cl. 239—84)

ABSTRACT OF THE DISCLOSURE

Apparatus for atomizing and spraying thermoplastic material comprises a melt unit for melting a rod of thermoplastic material and discharging the molten material to a spray head having pairs of concentrically arranged nozzles for supplying one nozzle of each pair while the other is supplied with heated air, the feeding or rod and the supply of air being simultaneously controlled.

---

This invention relates to apparatus for atomizing and spraying molten thermoplastic material and has for its object the provision of a novel and improved apparatus for applying molten thermoplastic adhesive by means of an atomized spray which apparatus is of relatively simple and inexpensive construction and yet is most efficient and dependable in operation.

With this object in view, and in accordance with features of the invention, the herein illustrated embodiment includes a device for melting solid thermoplastic material having an outlet and means for delivering molten material from the outlet, and a spray head having a pair of axially spaced nozzles and provided with two passageways connected, respectively, with the two nozzles. One of these passageways is connected to the output of the melting device while the other is connected to a source of heated air under pressure and a valve is provided in the first named passageway for controlling the flow of molten material to the nozzle connected thereto while means are provided for simultaneously controlling the action of this valve and the operation of the molten material delivering means.

More particularly, the melting and feeding device comprises a heated body formed with a passageway and adapted to melt the leading end of a solid rod of thermoplastic adhesive fed into one end of the melt unit and to deliver molten thermoplastic adhesive from the opposite end thereof and means for feeding the leading end of a solid rod of thermoplastic adhesive into said one end of the melt body. Preferably, the spray head has a plurality of pairs of axially spaced concentrically arranged conical nozzles and its two passageways are connected, respectively, with one nozzle of each pair and with the nozzles connected with the passageway leading from the source of heated air under pressure being located in advance of the other nozzles.

The above and other objects and features of the invention will appear in the following detailed description of the embodiment illustrated in the accompanying drawings and will be pointed out in the claims.

In the drawings:

FIG. 1 is a view in front elevation and partly in vertical section of the discharge end of apparatus for atomizing and spraying molten thermoplastic material embodying the features of this invention;

FIG. 2 is a view in side elevation on a slightly reduced scale of the atomizing and spraying apparatus including the portion shown in FIG. 1, and FIG. 3 is an electrical diagram.

Referring to these drawings and particularly to FIGS. 1 and 2 thereof, the apparatus therein illustrated includes a device for melting solid thermoplastic material comprising a melt body 10, mounted on a main supporting plate 12 by means of spacer studs 14, 14 and nuts 16, 16. The melt body is provided with a passageway 18 extending from one end of the body to the other, into which the leading end of a solid flexible rod R of thermoplastic material is fed by means of a pair of feed rolls, not shown, but adapted to be driven by an electric motor, not shown, acting through an electromagnetic clutch 20 and a pair of gears 22, 24.

Supported on one end of the melt body 10 by means of an intervening block 30 is a spray head body 32, the block 30 being secured to the melt body by two screws, one of which is shown and indicated by the reference character 34 while the spray head body 32 is secured to the block 30 by two screws 44 one of which appears in FIG. 2. The block 30 is formed with a passageway 36 which connects the lower or discharge end of the passageway 18 in the melt body to a passageway 38 formed in the spray head. The passageway 38, in turn, leads to an annular space 40 which surrounds a valve 42. A check valve 26 in the passageway 36 is adapted to open in a direction to permit the flow of molten material from the discharge end of the passageway 18 through the passageways 36 and 38 into the annular space 40 in the spray head body 32.

As is shown in FIG. 1 of the drawings, the annular space 40 is provided by an enlargement of a bore 50 in the spray head 32 above a bushing 52 which is press fitted within this enlargement. The valve 42 has an axially extending bore 54, closed at its lower end by a plug 56 and two axially spaced sets of radial ports 58, 58 and 60, 60. At its upper end, which projects out of the spray head body 32, the valve body is connected to one arm of a lever 60, pivotally mounted by means of a trunnion shaft 62, on a bracket member 64. The other arm of the lever 60 is connected to the rod 66 of a piston 68 which is contained with a cylinder 70. Surrounding the upper portion of the valve 32 is a packing gland 72 held against suitable packing rings 74 by means of a cross bar 76 and screws 78, 78.

Secured to the lower face of the spray head body 32 by means of screws 80, 80 are a pair of nozzle holding plates 82, 84. The plate 82 has two bores 86, 86 and press fitted into each of these bores is a conical nozzle 88, FIG. 1. Each of these nozzles has a passageway 90 formed therein and a smaller diameter discharge orifice 92, the passageway 90 connecting the orifice 92 to a transverse passageway 94 formed in the spray head body 32. Similarly, the plate 84 is provided with two bores 96, 96 and press fitted into each of these bores is a conical nozzle 98. Each of these nozzle has a tapered inside surface 100, concentrically arranged and spaced axially with respect to the conical outside surface of a nozzle 88, and a discharge orifice 102. The conical inside surface of each nozzle 98 opens into a lateral passageway 104 formed in the plate 82 which passageway is in communication with a vertically extending passage 106 formed in the plate 82 and spray head body 32, FIG. 2.

Threaded into another transverse passageway 108 in the spray head body 32 is an elbow fitting 110 to which the lower end of an electrical heating tube 112 is joined. Connected to the upper end of this tube is a conduit 114 which leads to a suitable source of air under pressure, not shown, a conventional off-on valve, not shown, being provided in this conduit for controlling the flow of air under pressure through the tube 112, passageways 108, 106, 104 and out through the orifices 102 in the nozzles 98.

Referring to FIG. 3, the operation of the piston 68 is controlled in a conventional manner by means of a solenoid operated valve, not shown, but having a coil 120.

This coil is in a circuit interposed between power lines 130, 132 and including a manual switch 134 and a control switch 136 which, when closed, energize the aforementioned coil 120 and also, through a rectifying circuit, including a resistor 137 and diode 138 and a capacitor 140, the coil 142 of the magnetic clutch 20. As will be apparent, when the main switch 134 and control switch 136 are closed the valve will be elevated and the clutch will be engaged to set the rod feed mechanism into operation.

Also interposed between the power lines 130, 132 are three electric heaters 150, 152 and 154 associated, respectively, with the melt body 10, spray head 32 and heating tube 112. The electrical heaters 150, 152 are controlled, respectively, by thermostats 156 and 158. Relays 160, 162 with contacts 160A and 162A and 162B, control the flow of current to the heaters 152 and 154, as shown, and a pressure switch 166 is arranged to discontinue the flow of current to the heater 154 in the air heating tube 112 when pressure of air-flow therethrough falls below a certain predetermined value. Suitable signal lights 170, 172, 174 and 176 are arranged to indicate when the various circuits are energized and a main switch 180, 182 is provided for connecting the lines 130, 132 to a suitable source of electrical energy.

The apparatus described above may be used for applying, by means of an atomized spray of molten material, two continuous spaced apart bands B of thermoplastic adhesive onto a work piece W, FIGS. 1 and 2, which may be the edge portion of a continuous web of paper, fed along in the direction of the arrow, FIG. 2; two spaced apart bands of molten adhesive on separate work pieces, e.g., marginal portions in spaced apart relation, or two rows of spaced apart dots or dashes of molten thermoplastic adhesive onto either a continuous web or onto the marginal portions of spaced apart work pieces. In the first instance, the switch 136 would be omitted, or kept closed, while in the latter two instances this switch would be opened and closed in a predetermined time relation to the work feeding mechanism of a parent machine to which the apparatus is applied.

In each of the aforementioned instances, however, the operation of the device to atomize and spray molten thermoplastic material, such for example as thermoplastic adhesive, is the same. Thus, when the switches 134 and 136 are closed, the former switch manually to start the operation of the apparatus and the latter manually or automatically by means of the parent machine, the coil 120 of the solenoid operated valve and the coil 142 of the magnetic clutch are simultaneously operated. As a result, the valve 42 is elevated to connect the annular space 40 with the transverse passageways 94, 94 and the leading end of the rod R is fed into the right hand end of the passageway 18 in the melt body. The melt body 10 and the spray head 32 having already been brought up to operating temperatures by the heaters 150, 152, the leading end of the solid rod of thermoplastic material R will be melted and molten thermoplastic material will be forced out past the check valve 26, through passageways 36, 38, annular space 40, ports 58, 58, bore 54, ports 60, 60 transverse passageway 94, 94 and will cause a stream of molten adhesive to be extruded through the discharge orifice 92 of each nozzle 88.

At the same time, compressed air, heated by its passage through the tube 112 will be fed to the lateral passage 104 in the nozzle holding plate 82 and then delivered as a high velocity stream out through the orifice 102 of each of the nozzles 98. This high velocity stream of heated air will pick up and atomize the thermoplastic material as it is extruded through each nozzle 88 so that the molten material will be projected as a highly directional spray of the molten material, as shown, which as it impinges on the surface of the moving work piece W coalesces into a relatively narrow and quite well defined band of molten adhesive capable of forming an adhesive bond with another marginal portion, if immediately pressed thereagainst, or of being reactivated by a subsequent application of heat thereto.

Although the exact physical dimensions and spacial relationship of the nozzles 88 and 98 may be varied to suit different operating conditions and various thermoplastic materials, optimum results have been obtained with a molten thermoplastic adhesive having a viscosity of 50,000, or less, centipoises at 450 degrees F. temperature and nozzles of the following dimensions and arrangement. In nozzle 98 the included angle of the inside conical surface 100 equals 45°; the diameter of the discharge orifice 102 equals .047″ and the length of the orifice passage equals .047″. Also, the outside surface of this nozzle is arranged to make a sharp edge at the end of the discharge orifice. The dimensions of the nozzle 88 are not especially critical except that it must be of exterior shape and size to fit within the nozzle 98, in the manner shown in FIG. 1. Also, the discharge end of this nozzle should be spaced about ³⁄₁₆″–¼″ from the inner end of the discharge orifice 102 of the nozzle 98. The pressure of the compressed air used may vary but preferably it is of a value to provide an exact velocity through the nozzle orifices 102 of substantially sonic speed.

While in the herein illustrated embodiment, a spray head provided with two pairs of spray nozzles is shown, it will be understood that other spray heads may be constructed with a single pair of spray nozzles or with more than two pairs where it is desired to apply in the first instance a single band of adhesive, or in the second instance, more than two spaced apart bands of adhesive. In each instance, however, the two nozzles of each pair will be constructed in accordance with the herein described nozzle arrangement.

Having thus described our invention, what we claim as new and desire to secure by Letters Patent of the United States is:

1. Apparatus for atomizing and spraying thermoplastic material comprising a melt unit for melting solid thermoplastic material including a heated body formed with a passageway and adapted to melt the leading end of a solid rod of thermoplastic material fed into one end of the passageway and to discharge molten thermoplastic material out of the opposite end thereof and means for feeding the leading end of a solid rod of thermoplastic material into said one end of the passageway, a spray head having a plurality of pairs of axially spaced apart concentrically arranged conical nozzles, said spray head being formed with two passageways each connected with one nozzle of each pair, means connecting one of said two passageways with the discharge end of first said passageway, means connecting the other of said two passageways with a source of heated air under pressure, the nozzles connected to said other passageway being located in advance of said other nozzles, a valve in said one passageway for controlling the flow of molten material through the nozzles connected thereto, and means for simultaneously controlling the action of said valve and the operation of said rod feeding means.

References Cited

UNITED STATES PATENTS

| | | | |
|---|---|---|---|
| 1,930,373 | 10/1933 | Stubenrauch | 239—84 |
| 2,995,159 | 8/1961 | Berggren | 222—146 |
| 3,152,923 | 10/1964 | Marshall et al. | 118—2 |
| 3,281,576 | 10/1966 | Cooper et al. | 222—146 |

FOREIGN PATENTS 385,857  1/1933  Great Britain.

WALTER SOBIN, *Primary Examiner.*